March 24, 1964  R. K. ARMSTRONG  3,126,305
IGNITION COMPOSITIONS COMPRISING BORON CONTAINING SALTS
Filed Jan. 12, 1962

INVENTOR
ROBERT K. ARMSTRONG

BY

ATTORNEY

United States Patent Office 3,126,305
Patented Mar. 24, 1964

3,126,305
IGNITION COMPOSITIONS COMPRISING BORON CONTAINING SALTS
Robert K. Armstrong, Glassboro, N.J., assignor to E. I. du Pont de Nemours and Company, Wilmington, Del., a corporation of Delaware
Filed Jan. 12, 1962, Ser. No. 166,469
7 Claims. (Cl. 149—77)

This invention relates to a composition, and more particularly, to an ignition composition.

Ignition compositions find wide utility in the explosives art in such uses, for example, as in ignition cords and in electric initiators such as blasting caps and squibs. This invention provides a broad new class of ignition compositions. The compositions of this invention are characterized, among other things, by outstanding versatility. Thus, for example, compositions of this invention range, depending upon the particular constituents employed, from fast functioning ignition compositions to slow functioning compositions useful, for example, in delay blasting caps.

The ignition compositions of this invention comprise an intimate physical mixture of (a) a metal salt of a boron-containing acid selected from the group consisting of decahydrodecaboric acid and dodecahydrododecaboric acid, and (b) a solid inorganic oxidizing agent.

Figure 1:
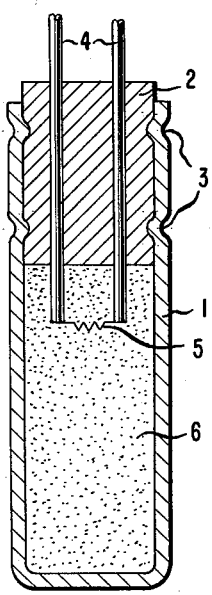
Figure 2:
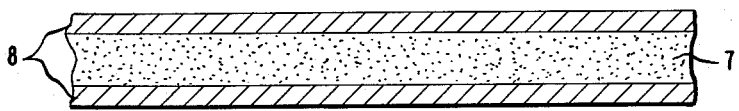

Illustrative products prepared employing the compositions of this invention are shown in the accompanying drawings wherein FIGURE 1 is a cross-sectional view of an electric initiator containing an ignition composition of this invention and FIGURE 2 is a representative longitudinal cross-section of a piece of ignition cord containing a composition of this invention.

The solid metal salts of decahhydrodecaboric acid employed in the instant invention are conveniently prepared by reacting an aqueous solution of the acid represented by the formula $H_2B_{10}H_{10} \cdot (H_2O)_m$ where $m$ is zero or a positive integer, e.g., 1 to 3, or as the hydronium compound $(H_3O)_2B_{10}H_{10} \cdot (H_2O)_m$ where $m$ is the same as above, or a soluble salt of this acid, for example, an ammonium salt, with a solution of a soluble salt of that metal whose $B_{10}H_{10}$ salt is desired under such conditions, e.g., particular solvent and concentration, that the desired $B_{10}H_{10}$ salt precipitates from the reaction solution. A preferred solvent system for this process employs water. When aqueous solutions are used, the process involves the step of adding to an aqueous soluiton of a water-soluble salt of such metal a second aqueous solution of a compound selected from the group consisting of the acid $H_2B_{10}H_{10}$, the hydronium compound, or water-soluble salts of the acid. Alternative methods of preparing the solid metal salts of decahydrodecaboric acid, as well as a more detailed discusison of the above preparation are disclosed in copending application Serial No. 6,855, filed February 5, 1960, in the name of W. H. Knoth, Jr., and assigned to the present assignee. All of the preparation methods disclosed in the aforementioned application are incorporated herein by reference.

The solid metal salts of dodecahydrododecaboric acid used in the instant invention also are conveniently prepared by the above procedure in which an aqueous solution of the acid represented by the formula $$H_2B_{12}H_{12} \cdot (H_2O)_m$$

where $m$ is zero or a positive integer, e.g., 1 to 4, or as the hydronium compound $(H_3O)_2B_{12}H_{12} \cdot (H_2O)_m$ where $m$ is the same as above or a soluble salt of the acid, for example, an ammonium salt, is caused to react with a solution of a soluble salt of that metal whose $B_{12}H_{12}$ salt is desired under such conditions, e.g., particular solvent employed, that the desired $B_{12}H_{12}$ salt precipitates from the reaction solution. Alkali and alkaline-earth dodecahydrododecaborates can be prepared by reacting an alkali or alkaline-earth metal hydroborate with diborane under superatmospheric pressure. The above and alternative methods of preparing metal salts of dodecahydrododecaboric acid are disclosed in copending application Serial No. 30,443, filed May 20, 1960, now abandoned, in the name of H. C. Miller and E. L. Muetterties and assigned to the present assignee and the methods described therein are incorporated herein by reference.

Metal cations of the decahydrodecaboric and dodecahydrododecaboric acid salts can be derived generally from any metal. The metals according to the periodic table in Deming's General Chemistry, edition 5, chapter 11, John Wiley and Sons, Inc., and in Lange's Handbook of Chemistry, edition 9, pp. 56–57, Handbook Publishers, Inc. (1956), are the elements of groups I, II, VIII, IIIB, IVB, VB, VIB, VIIB as well as the elements of groups IIIA, IVA, VA, and VIA which have atomic numbers above 5, 14, 33, and 52, respectively. These metals include both light and heavy metals. The light meals are also known as the alkali metals and the alkaline-earth metals. The heavy metals include brittle, ductile, and low-melting metals as described in the above-mentioned periodic table in Lange's Handbook of Chemistry.

Preferred metals for use in the boron acid salts of this invention are the light metals, particularly the alkali and alkaline-earth metals of groups IA and IIA having an atomic number less than 87, including, for example, lithium, sodium, potassium, cesium, magnesium, calcium, and barium, because these boron acid salts are easier to isolate from the reaction mixture. Cesium is a particularly preferred metal cation.

Examples of metal salts of boron-containing acids which can be used in the subject compositions are sodium decahydrodecaborate, magnesium decahydrodecaborate, titanium decahydrodecaborate, vanadium decahydrodecaborate, chromium decahydrodecaborate, manganese decahydrodecaborate, iron decahydrodecaborate, cobalt decahydrodecaborate, nickel decahydrodecaborate, copper decahydrodecaborate, zinc decahydrodecaborate, aluminumdecahydrodecaborate, antimony decahydrodecaborate, tin decahydrodecaborate, potassium dodecahydrododecaborate, calcium dodecahydrododecaborate, lanthanum dodecahydrododecaborate, zirconium dodecahydrododecaborate, molybdenum dodecahydrododecaborate, iron dodecahydrododecaborate, cobalt dodecahydrodedecaborate, silver dodecahydrododecaborate, cadmium dodecahydrododecaborate, aluminum dodecahydrododecaborate, lead dodecahydrododecaborate, bismuth dodecahydrododecaborate and mixtures thereof. Double metal salts of the aforementioned acids such as, for example, the double salt of cesium decahydrodecaborate and cesium nitrate, the double salt of cesium decahydrodecaborate and cesium dichromate, the double salt of cesium nitrate and mixtures thereof can also be employed in the subject invention. Such double salts can be prepared, for example, by bringing together in aqueous solution, the various constituents of the double salt in substantially stoichiometric proportions and precipitating the resulting products from the aqueous medium. Thus, for example, the double salt of cesium decahydrodecaborate and cesium dichromate can be prepared by bringing together in an aqueous solution a substantially stoichiometric mixture of tirethylammonium decahydrodecaborate, potassium dichromate and cesium hydroxide and precipitating the double salt from the resulting mixture.

Any solid inorganic oxidizing agent which will yield oxygen or sulfur upon decomposition and which will readily oxidize the boron-containing acid employed in the subject compositions, that is, will readily react or burn with the boron-containing acid, can be employed as the second essential constituent of the compositions of this invention. Solid oxygen-containing metal salts are preferred as oxidizing agents because of their availability and ease of incorporation into the composition.

Examples of solid inorganic oxidizing agents which can be used in the subject invention are ammonium, alkali, and alkaline-earth salts of inorganic oxygen-containing acids, such an nitric, chloric, perchloric, persulfuric, thiosulfuric, permanganic, periodic, iodic, bromic and chromic acids. Representative of these are cesium nitrate, barium nitrate, ammonium nitrate, sodium nitrate, potassium nitrate, potassium perchlorate, ammonium perchlorate, potassium chlorate, potassium permanganate, lithium perchlorate, sodium perchlorate, sodium dichromate, sodium thiosulfate, and lead chromate. Other solid inorganic oxidizing agents include lead thiocyanate, the oxides and peroxides of the light and heavy metals and nonmetals, such as barium peroxide, lead peroxide ($PbO_2$), lithium peroxide, ferric oxide, red lead ($Pb_3O_4$), cupric oxide, tellurium dioxide, antimonic oxide, etc. Mixtures of the aforementioned oxidizing agents also can be used.

As indicated hereinbefore the properties of the compositions of this invention can be varied widely depending upon the particular boron-containing acid and solid inorganic oxidizing agent employed and the ratio therefor. Generally, the molar ratio of the solid inorganic oxidizing agent to the metal salt of the boron-containing acid is preferably within the range of about from 0.5/1 to 10/1 respectively.

Additives conventionally employed in ignition compositions such as linear vinylidene fluoride-hexafluoropropylene copolymer; methylcellulose; gum arabic; dextrin; elastomeric compositions including, for example, polyurethanes, chloroprene rubbers, natural rubbers, acrylonitrile-butadiene elastomers, styrene-butadiene rubbers, polyisobutylene rubbers, and polysulfides, can be added to the compositions of this invention in conventional amounts, for example, in amounts up to about 2% by weight.

The compositions of this invention are prepared by merely intimately mixing the finely divided constituents therefor in conventional mixing equipment. Usually, although not necessarily, constituents having a particle size of less than 40 mesh (U.S. standard series) are employed in order to obtain optimum intermixture of the constituents. The preferred particle size is 100 mesh. The compositions of this invention are incorporated in various articles such as, for example, electric initiators and ignition cords, by procedures conventionally employed in the art for known ignition compositions.

Referring now to the drawings which illustrate the use of the ignition compositions of this invention, in FIGURE 1, 1 represents a tubular shell, e.g., of aluminum, copper, bronze, etc., 2 is a sealing plug, e.g., of natural or synthetic rubber, 3 are peripheral crimps in the shell wall for maintaining the plug in position, 4 are leg wires, 5 is a resistance bridgewire, 6 is an intimate blend of the novel ignition composition of the invention. It will be noted that in the embodiment of FIGURE 1, charge 6 is the only charge present in the igniter; however, additional charges conventionally used as priming or base charges may be positioned below and adjacent charge 6 and may, in turn, be initiated or ignited by charge 6 and this is intended to be within the scope of the invention. All of the above features, except the novel ignition composition, represent conventional elements of electric initiators.

In FIGURE 2, 7 represents a continuous core of the composition of the invention contained within a flexible sheath 8, e.g., of nonmetallic material, such as fiberglass, or a ductile metal, e.g., aluminum, lead, copper, or a braided metal wire.

In addition to the foregoing specific examples, the following more detailed working examples illustrate numerous compositions of this invention and the properties thereof. In Example 1, immediately following, the effect of varying the proportions of the metal salt of the boron-containing acid and the solid inorganic oxidizing agent on the properties of the various compositions of this invention is illustrated.

EXAMPLE 1

Blends of cesium decahydrodecaborate ($Cs_2B_{10}H_{10}$) or cesium dodecahydrododecaborate ($Cs_2B_{12}H_{12}$), respectively, and potassium perchlorate were prepared by intimately mixing 100-mesh cesium decahydrodecaborate or dodecahydrododecaborate and 100-mesh potassium perchlorate in a mechanical blender. The various blends prepared and the physical and exposive properties of these blends are given in the following tables.

Table I

| Blends of $Cs_2B_{10}H_{10}$/ $KClO_4$ (moles) | Impact Sensitivity (inches) | Static Sensitivity (mev.) | Ignition Time (milliseconds) 2 grains loose | Thermal Stability (° C.) |
| --- | --- | --- | --- | --- |
| 1/0.5 | >45 | >77,500 | 4.2 | 480 |
| 1/1 | 6 | >77,500 | 3.4 | 485 |
| 1/2 | * | * | * | 490 |
| 1/6 | 8 | >77,500 | * | 495 |
| 1/8 | 2 | >77,500 | 3.6 | 500 |
| 1/10 | 3 | 25,600 | 3.5 | 510 |

*Not determined.

Table II

| Blends of $Cs_2B_{12}H_{12}$/ $KClO_4$ (moles) | Impact Sensitivity (inches) | Static Sensitivity (mev.) | Ignition Time (milliseconds) 2 grains loose | Thermal Stability (° C.) |
| --- | --- | --- | --- | --- |
| 1/0.5 | >45 | >77,500 | * | 475 |
| 1/1 | >45 | >77,500 | 5.0 | 450 |
| 1/6 | 5 | >77,500 | 4.5 | 440 |

*Not determined.

The impact sensitivity of the compositions in the above tables was determined by placing a portion of the composition of this invention in a thin, uniform layer on a steel plate and determining the height at which a ½-inch diameter steel ball (8.3 grams) dropped on the mixture will detonate the mixture. When the steel ball is dropped from a height of at least 45 inches and the mixture does not detonate, the mixture is termed impact insensitive. The static sensitivity was determined conventionally by placing a portion of the mixture in a copper shell having leg wires. The leg wires were twisted together and connected to the high voltage terminal of a double "leg-to-shell" static sensitivity apparatus consisting essentially of a source of variable voltage and a series of micromicrofarad condensers ranging in capacitance from 250–2000 $\mu\mu fd.$; the shell was connected to a ground line. Voltages from 0 to 30,000 volts were applied to a condenser of known capacitance in increments of 1,000 volts and the condenser was allowed to discharge through the shell containing the mixture. Those mixtures are considered not static sensitive in which a static charge of at least 10,000 volts at 0.0003 microfarad, i.e., 10,000 man-equivalent volts (m.e.v.) is needed to ignite or detonate the mixture (1 man-equivalent-volt charge is the energy of a condenser of 0.0003 microfarad capacitance charged to a potential of 1 volt). The maximum charge which may be applied in conventional equipment is 77,500 m.e.v. The ignition time was determined in the above tables by using 2 grains of a loose or pressed composition of this invention as the ignition charge in a conventional electric blasting cap assembly consisting of a copper shell containing 4 grains of pentaerythritol tetranitrate pressed at 200 pounds as the base charge and 3 grains of lead azide pressed at 200 pounds as the primer charge, applying a direct current of 5 amperes to a 0.0019-inch diameter "Nichrome" (80/20 alloy of nickel and chromium) bridgewire imbedded in the ignition charge, and measuring the time interval between the closing of the switch on the source of the firing current and a bursting of the shell. The thermal stability is that temperature up to which the mixture exhibited no change in appearance or did not detonate.

An equimolar amount of other metal salts of the aforementioned boron-containing acids such as, for example, sodium, magnesium, barium, potassium, calcium, silver decahydrodecaborate or dodecahydrododecaborate can be employed in the above compositions to yield ignition compositions having generally similar properties.

The following example illustrates the use of various different solid oxidants in the compositions of this invention.

EXAMPLE 2

Mixtures in the proportions indicated in the following tables were prepared according to the procedure of Example 1. The physical and explosive properties of these blends are as follows.

*Table III*

| Mixtures | | Ignition Time (milliseconds) | | Impact Sensitivity (inches) | Static Sensitivity (mev.) | Thermal Stability (° C.) |
|---|---|---|---|---|---|---|
| Boron-Containing Salt/Oxidant | Mole Ratio | 3 grains pressed at 200 lbs | 2 grains loose | | | |
| $Cs_2B_{10}H_{10}/CsNO_3$ | 1/1 | * | 5.0 | >45 | 21,900 | 390 |
| $Cs_2B_{10}H_{10}/KClO_3$ | 1/6 | * | 3.2 | 3 | 27,400 | 330 |
| $Cs_2B_{10}H_{10}/NaNO_3$ | 1/6 | 17.9 | 4.8 | >45 | 54,800 | 335 |
| $Cs_2B_{10}H_{10}/Pb_3O_4$ | 1/3 | 29.6 | 6.7 | >45 | 26,400 | 510 |
| $Cs_2B_{10}H_{10}/KMnO_4$ | 1/3 | 48.7 | 5.6 | 10 | 14,680 | 280 |
| $Cs_2B_{10}H_{10}/Na_2Cr_2O_7 \cdot 2H_2O$ | 1/2 | 238.6 | 135.1 | >45 | >77,500 | 260 |
| $Cs_2B_{10}H_{10}/BaO_2$ | 1/6 | 66.6 | 16.3 | >45 | 54,100 | 510 |
| $Cs_2B_{10}H_{10}/Na_2S_2O_3$ | 1/2 | 52.6 | 12.1 | 35 | 24,600 | * |

*Not determined.

The impact and static sensitivity and the ignition time and thermal stability of the mixtures in Table III were determined by the methods described in Example 1. All of the squibs functioned satisfactorily.

The use of the novel ignition compositions in ignition cord depicted in FIGURE 2 is illustrated by the following.

EXAMPLE 3

A number of ignition cords were prepared by drawing down through a series of dies a lead tube filled with one of the following mixtures. The distribution of the mixture within the lead sheath, the outer diameter of the cords, and the burning rate of the cords are summarized in Table IV.

*Table IV*

| Mixtures | | Outer Diameter of cord (inch) | Distribution of Mixture (grains/ft.) | Burning Rate (meter/sec.) | Burning Rate (in./sec.) |
|---|---|---|---|---|---|
| Boron-Containing Salt/Oxidant | Mole Ratio | | | | |
| $Cs_2B_{10}H_{10}/KClO_3$ | 1/6 | 0.105 | 11.05 | 329 | * |
| $Cs_2B_{10}H_{10}/NaNO_3$ | 1/6 | 0.105 | 10.5 | 158 | * |
| $Cs_2B_{10}H_{10}/Pb_3O_4$ | 1/3 | 0.105 | 26.4 | * | 0.86 |
| $Cs_2B_{10}H_{10}/KMnO_4$ | 1/3 | 0.105 | 16.4 | 14.8 | * |
| $Cs_2B_{10}H_{10}/Na_2Cr_2O_7 \cdot 2H_2O$ | 1/2 | 0.105 | 11.08 | * | 0.31 |
| $Cs_2B_{10}H_{10}/BaO_2$ | 1/6 | 0.105 | 19.4 | * | 1.75 |
| $Cs_2B_{10}H_{10}/Na_2S_2O_3$ | 1/2 | 0.105 | 11.2 | * | 1.0 |

*Not determined.

In a like manner, ignition cords can be prepared as described above with ignition compositions in which sodium, barium, potassium decahydrodecaborate, or dodecahydrododecaborate is substituted, on a molar basis, for some or all of the cesium decahydrodecaborate employed above.

I claim:

1. An ignition composition comprising an intimate physical mixture of (a) a metal salt of a boron-containing acid selected from the group consisting of decahydrodecaboric acid and dodecahydrodecaboric acid, and (b) a solid inorganic oxidizing agent.

2. An ignition composition of claim 1 wherein said metal in said metal salt is selected from the group consisting of alkali and alkaline earth metals of groups IA and IIA having an atomic number of less than 87 and said solid inorganic oxidizing agent is an oxide or peroxide.

3. An ignition composition of claim 1 wherein said metal in said metal salt is selected from the group consisting of alkali and alkaline earth metals of groups IA and IIA having an atomic number of less than 87 and said solid inorganic oxidizing agent is selected from the group consisting of ammonium, alkali, and alkaline earth salts of oxygen-containing inorganic acids.

4. An ignition composition of claim 3 wherein said metal salt is a salt of decahydrodecaboric acid.

5. An ignition composition of claim 3 wherein said metal salt is a salt of dodecahydrododecaboric acid.

6. An ignition composition comprising an intimate physical mixture of cesium decahydrodecaborate and potassium perchlorate.

7. An ignition composition comprising an intimate physical mixture of cesium dodecahydrododecaborate and potassium perchlorate.

No references cited.